2,972,142
METHOD AND APPARATUS FOR MEASURING THE VELOCITY OF A PROJECTILE

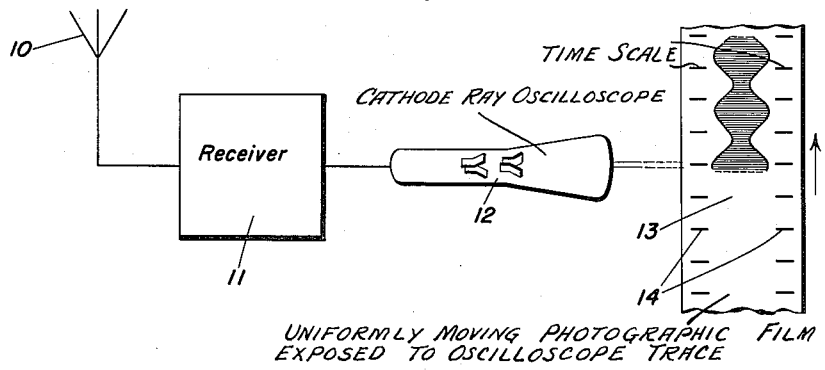
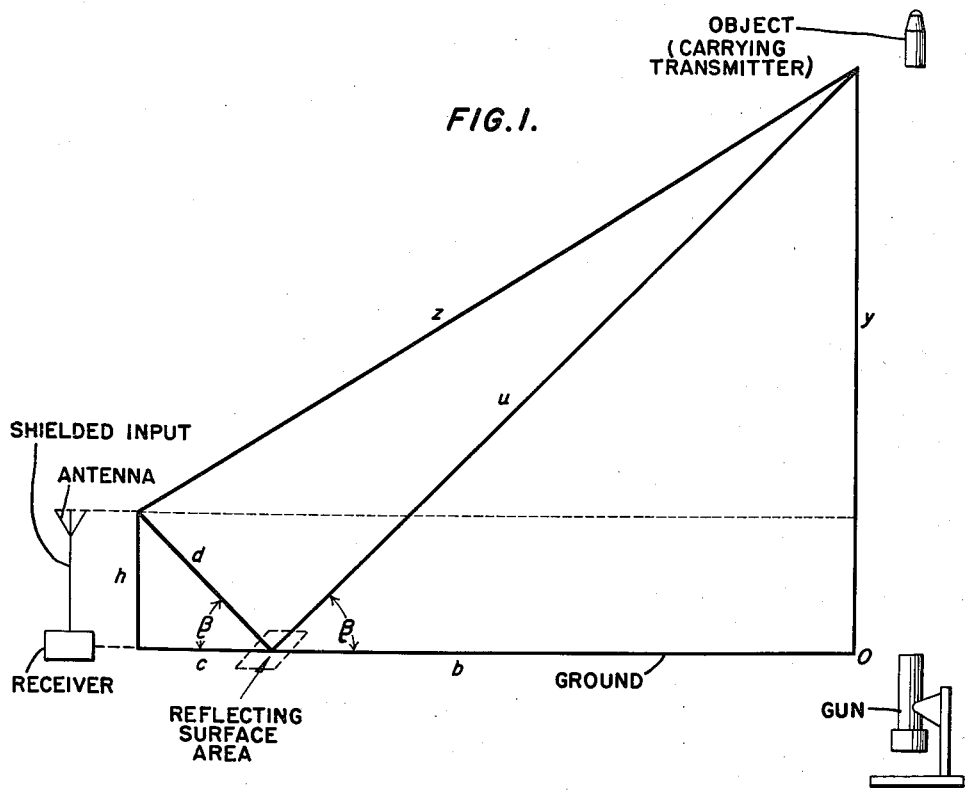

William C. Parkinson, Washington, D.C., and Elmore R. Chatham, Mexia, Tex., assignors to the United States of America as represented by the Secretary of the Navy Filed Mar. 7, 1944, Ser. No. 525,476

5 Claims. (Cl. 343—8)

This invention relates to a method and apparatus for measuring the velocity of a projectile in flight.

One object of this invention resides in the provision of a novel method and apparatus for measuring the velocity of a projectile in flight by mounting in a projectile a radio sonde which generates radio waves of known frequency, receiving the waves by a receiving antenna of known height, and measuring the modulation in the received R.F. signal caused by the fact that waves reaching the antenna directly and waves reaching the antenna after reflection from the ground are in varying phase due to the path difference.

Another object of the invention is to provide a method and apparatus for measuring the velocity of a projectile in flight by recording the envelope of the modulated R.F. signal referred to above after producing a visual image of that signal on an oscilloscope.

Another object of the invention is to provide a method and apparatus for measuring the velocity of a projectile in flight which is simple, positive, and accurate.

These and other objects of the invention will be apparent from the following specification and the accompanying drawing, in which Fig. 1 is a diagram showing the various distances used in deriving the formula used to calculate the velocity of the projectile; and Fig. 2 is a diagrammatic showing of the device utilized in recording the envelope of the modulated signal.

In Fig. 1 of the drawing, a gun fires a projectile vertically at O along the path $y$. The projectile contains a radio sonde which generates a radio signal of known frequency. This signal reaches antenna $h$ of known height located a known distance $b$ from the gun at O by a direct path $z$ and by a path $u$ plus a reflected path $d$.

In deriving a formula for computing the projectile velocity at a given point, it is obvious from the drawing that the difference in path length between the direct-received signal and the reflected signal is $(d+u)-z=\Delta$ and can be found as follows:

Using the Pythagorean proposition, (1) $$z=(b^2+(y-h)^2)^{1/2}$$

From Fig. 1, $h=d \sin \beta$; $c=d \cos \beta$; $c=h \cot \beta$; where $c$ is the distance from the base of antenna $h$ to the point at which reflection occurs from the horizontal plane through O.

$$\cos \beta = \frac{b-c}{u}$$

$$u = \frac{b-c}{\cos \beta} = \frac{b}{\cos \beta} - \frac{c}{\cos \beta}$$

Since $$\frac{c}{\cos \beta} = d$$

then $$u = \frac{b}{\cos \beta} - d$$

or $$d+u = \frac{b}{\cos \beta}$$

and $$\cos \beta = \frac{b}{d+u}$$

From the similar triangles, we get the relation $$\cos \beta = \frac{b}{(b^2+(y+h)^2)^{1/2}}$$

so that by substituting in the preceding equation, $$\frac{b}{d+u} = \frac{b}{(b^2+(y+h)^2)^{1/2}}$$

and (2) $$d+u=(b^2+(y+h)^2)^{1/2}$$

To find the path difference $\Delta$ as a function of $y$, using Equations 1 and 2 above, (3) $$\Delta = d+u-z = f(y) = (b^2+(y+h)^2)^{1/2} - (b^2+(y-h)^2)^{1/2}$$

Since $$\Delta = f(y)$$

then $$\frac{d\Delta}{dt} = \frac{df(y)}{dy} \cdot \frac{dy}{dt}$$

and substituting (3)

$$\frac{d\Delta}{dt} = [\tfrac{1}{2}(b^2+(y+h)^2)^{-1/2}(2) \cdot (y+h) - \tfrac{1}{2}(b^2+(y-h)^2)^{-1/2} \cdot 2 \cdot (y-h)]\frac{dy}{dt}$$

or $$\frac{d\Delta}{dt} = \left[\frac{y+h}{(b^2+(y+h)^2)^{1/2}} - \frac{y-h}{(b^2+(y-h)^2)^{1/2}}\right]\frac{dy}{dt}$$

If the frequency of the modulated R.F. signal$=C/\lambda$ where C is a constant representing the velocity of travel of the R.F. waves, and $\lambda$ represents the wave length, then (4)
$$\frac{1}{\lambda}\frac{d\Delta}{dt} = \text{frequency (c.p.s.)}$$

$$= \frac{1}{\lambda}\left[\frac{y+h}{[b^2+(y+h)^2]^{1/2}} - \frac{y-h}{[b^2+(y-h)^2]^{1/2}}\right] \cdot V$$

inasmuch as $$\frac{dy}{dt} = V$$

the velocity of the projectile.

Since for the major part of the flight of the projectile, $h$ is negligible with respect to $y$, Equation 4 becomes (5) $$f = \frac{1}{\lambda} \frac{2h}{\sqrt{b^2+y^2}} \cdot V$$

Since the expression for the frequency involves two variables $y$ and $V$ which are related by the time, it is only necessary to measure the frequency as a function of time to get a complete set of data. In Fig. 2 is shown a schematic diagram of a device for recording the frequency as a function of time by receiving the R.F. signal at antenna 10, amplifying the signal in receiver 11 which controls oscilloscope 12 to give a visual image of the received R.F. signal. This visual image is recorded on a moving strip of film 13 having indicia 14 to represent time intervals. This image which is of the general nature shown in Figure 2, shows the resultant of the direct and reflected waves, and has an envelope from which the beat frequency can be found by inspection. Suitable receivers, oscilloscopes, and film recording devices are conventional in the electrical art and their structure constitutes no part of the present invention. Any other suitable apparatus for performing their function may be used.

An example of calculating a projectile velocity by the formula derived above follows:

Consider $h$ to be about 15', $b$ to be about 3000', and $\lambda$ to be about 10'. Then $$f \simeq \frac{1}{10} \frac{30 \times V}{\sqrt{9.10^6 + y^2}}$$

If $y=0$; $f$ is approximately 2 c.p.s.; then V is approximately 2000 ft./sec. If $y=3000'$; $f$ is approximately 1 c.p.s., then V is approximately 1500 ft./sec.

This example is merely for purposes of illustration and it is at once apparent that with this low frequency, a measurement of the velocity would be very inaccurate. However, by a careful choice of constants $h$, $b$ and $\lambda$, the frequency of the modulated R.F. signal can be increased by a considerable factor and the accuracy improved.

By comparing the velocity of a projectile at a given time interval after firing, as computed by the present invention, with the theoretical velocity at that time, calculations of resistance functions, drag coefficients, and other ballistic data may be made. Upon using a spin sonde such as that disclosed in application Serial No. 498,104, filed August 10, 1943, by M. A. Tuve and J. A. Van Allen, now Patent No. 2,931,897, both velocity and spin modulation appear and are easily distinguishable so that various other phenomena connected with the flight of the projectile are observable.

What is claimed is:

1. The process of determining the velocity of an object which rises substantially vertically and emits radio waves of known frequency, said process comprising receiving said waves through a direct path at a point a known distance above the initial level of the object and at a known distance horizontally from its trajectory, also receiving the waves at the same point through another path after reflection from the horizontal plane at said initial level, combining the two sets of waves thus received to produce a modulated signal, and determining the desired velocity from the beat frequency of said signal.

2. The process as defined in claim 1 wherein the modulated signal deflects an electron beam, and a photographic record of the electron beam deflections is made in order to determine the beat frequency of said signal.

3. The process of producing a record of the wave form of a modulated signal, for subsequently determining the speed of a rising object which is emitting electromagnetic radiation of known frequency, which comprises, receiving a portion of said radiation directly from said object at a point of known elevation above the level of the earth's surface and at a known distance horizontally from the path of the object, also simultaneously receiving, at said same point, another portion of said radiation after reflection from said surface, causing said portions to mix and produce a modulated signal, and making a record of the wave form of said signal.

4. Apparatus for producing a record of the wave form of a modulated signal for subsequently determining the velocity of an object, which comprises, a source of electromagnetic radiation of constant frequency, said source being carried by the object, thus to partake of the motion of said object, a reflector capable of reflecting said radiation, a receiver at a known elevation above the level of the reflector and also at a known horizontal distance from the object, said receiver being sensitive to the direct radiation emitted by the source and also to that of modified frequency received after reflection from said reflector, and combining these into a modulated signal, and an oscillographic camera connected to said receiver whereby a photographic record of the wave form of said modulated signal may be made.

5. Apparatus for producing a record of the wave form of a modulated signal for subsequently determining the velocity of an object, which rises substantially vertically, comprising, a source of electromagnetic radiation of constant frequency, said source being carried by the object, thus to partake of the substantially vertical motion of said object, a receiver at a known elevation above the level of the ground and also at a known horizontal distance from the object, said receiver being sensitive to the direct radiation emitted by the source and also to that of modified frequency received after reflection from the ground, and combining these into a modulated signal, and an oscillographic camera connected to said receiver whereby a photographic record of the wave form of said modulated signal may be made.

References Cited in the file of this patent

UNITED STATES PATENTS

| | | |
|---|---|---|
| 1,801,466 | Townsend | Apr. 21, 1931 |
| 1,981,884 | Taylor | Nov. 27, 1934 |
| 2,116,717 | Scharlau | May 10, 1938 |
| 2,133,615 | Gerhard | Oct. 18, 1938 |
| 2,134,716 | Gunn | Nov. 1, 1938 |
| 2,402,464 | Suter | June 18, 1946 |
| 2,423,023 | Hershberger | June 24, 1947 |